United States Patent
Parry

(10) Patent No.: US 10,671,945 B2
(45) Date of Patent: Jun. 2, 2020

(54) EXCHANGING ENCUMBRANCES ACROSS MULTIPLE TICKET HOLDERS

(71) Applicant: Amazon Technologies, Inc., Seattle, WA (US)

(72) Inventor: Stephan Tyler Parry, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 275 days.

(21) Appl. No.: 15/786,423

(22) Filed: Oct. 17, 2017

(65) Prior Publication Data

US 2019/0114562 A1    Apr. 18, 2019

(51) Int. Cl.
| | | |
|---|---|---|
| G06Q 10/02 | (2012.01) | |
| G06Q 30/06 | (2012.01) | |
| G06Q 10/00 | (2012.01) | |
| G06Q 50/10 | (2012.01) | |

(52) U.S. Cl.
CPC ........... *G06Q 10/02* (2013.01); *G06Q 10/00* (2013.01); *G06Q 30/0605* (2013.01); *G06Q 30/0611* (2013.01); *G06Q 30/0639* (2013.01); *G06Q 30/0643* (2013.01); *G06Q 50/10* (2013.01)

(58) Field of Classification Search
CPC .... G06Q 10/02; G06Q 10/00; G06Q 30/0605; G06Q 30/0611; G06Q 30/0639; G06Q 30/0643; G06Q 50/10
USPC .......................................................... 705/5
See application file for complete search history.

(56) References Cited

U.S. PATENT DOCUMENTS

| | | | | |
|---|---|---|---|---|
| 7,552,084 | B2* | 6/2009 | Fraser ................... | G06Q 30/08 705/37 |
| 8,849,720 | B2* | 9/2014 | Nestor ................... | G06Q 10/02 705/59 |
| 2008/0162211 | A1* | 7/2008 | Addington ............. | G06Q 10/02 705/14.5 |
| 2012/0010911 | A1* | 1/2012 | Lele ....................... | G06Q 10/00 705/5 |
| 2015/0371156 | A1* | 12/2015 | Jacob ..................... | G06Q 10/02 705/5 |

FOREIGN PATENT DOCUMENTS

| | | |
|---|---|---|
| WO | WO2011159811 A2 | 12/2011 |
| WO | WO2015092552 A2 | 6/2015 |

OTHER PUBLICATIONS

Ticketmaster.com, "FAQ", available at: https://developer.ticketmaster.com/support/faq/#q-13; accessed publication on Apr. 14, 2016 via internet archive. (Year: 2014).*

The PCT Search Report and Written Opinion dated Nov. 28, 2018 for PCT Application No. PCT/US2018/055602, 13 pages.

* cited by examiner

*Primary Examiner* — Kevin H Flynn
*Assistant Examiner* — Emmett K. Walsh
(74) *Attorney, Agent, or Firm* — Lee & Hayes, P.C.

(57) ABSTRACT

A ticketing system allows a ticket purchaser to encumber one or more tickets and, without purchasing the tickets, swap the encumbered tickets for other encumbered tickets. The ticketing system encumbers one or more tickets, and in response to an exchange request, searches for other encumbered tickets and facilitates an exchange. The shopping carts of the respective ticket holders can be updated to reflect the exchange. The encumbered ticket exchange may be between two parties, or may be a complex exchange between multiple holders of encumbered tickets prior to ticket purchase.

20 Claims, 6 Drawing Sheets

EXCHANGING ENCUMBRANCES ACROSS MULTIPLE TICKET HOLDERS

BACKGROUND

When offering tickets to an event, a ticketing system will typically make the selected seats temporarily unavailable to other purchasers before the transaction is completed. If the transaction is not completed within a predefined amount of time, the transaction is cancelled and the selected seats are made available to any purchaser. Where a ticket sales rate is relatively high, it may be difficult to find available seats in the most desired location, and oftentimes the only available seats are in a location that is less desirable, and a purchaser may temporarily encumber the less desirable seats in case the event becomes sold out and there are no available seats left.

However, there may be multiple purchasers who all encumber seats that are less desirable to them, and desire to find available seats that are more desirable without giving up the encumbered seats they have already located. However, in many ticketing systems, giving up selected seats to search for better seats results in the selected seats being returned to the pool of available seats that may then be reserved by other purchasers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
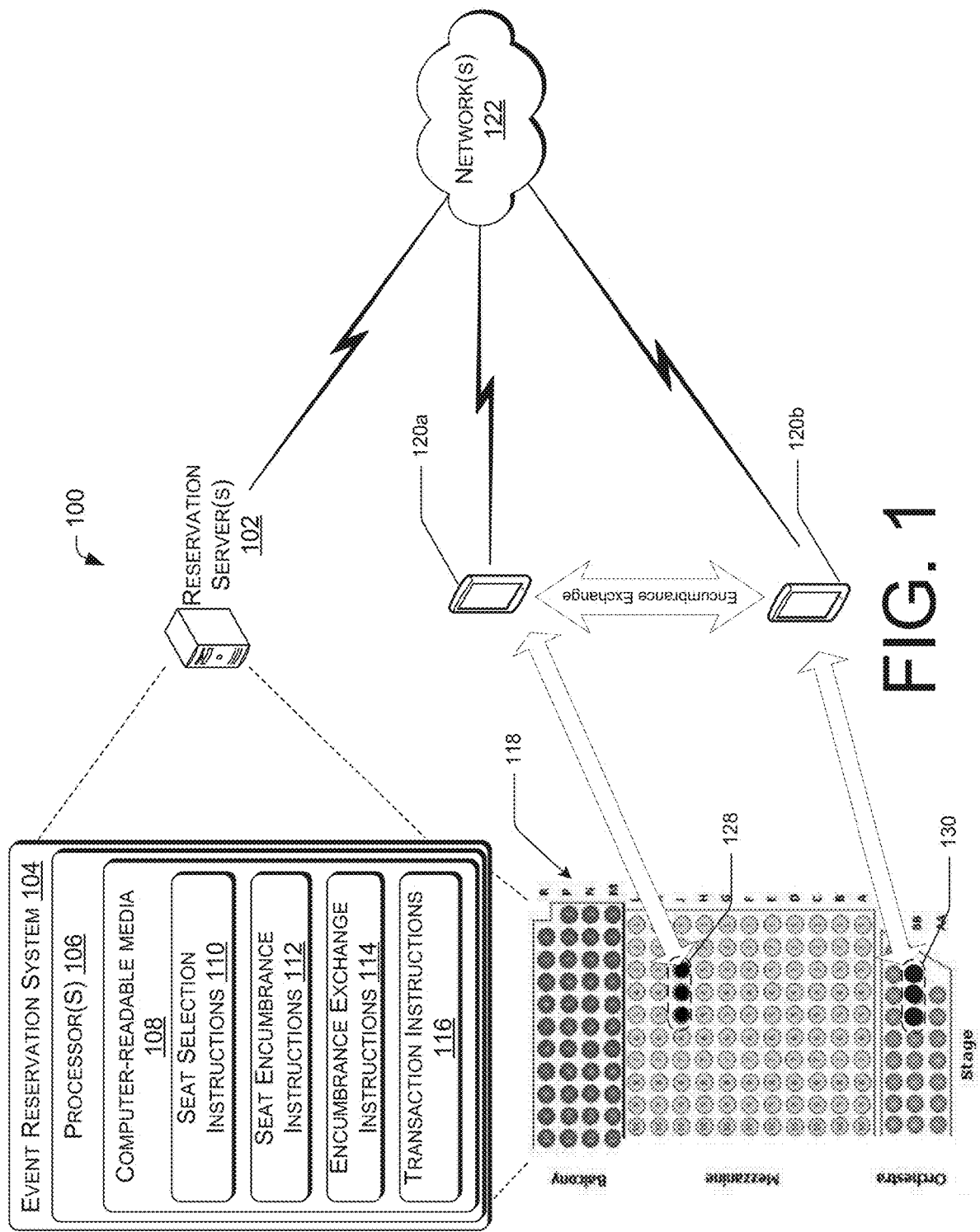
FIG. 1 is a block diagram illustrating an example of a ticketing system providing for encumbrance exchanges.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments of the present disclosure are directed to, among other things, methods and systems for encumbering event tickets and exchanging the encumbrances. When selecting tickets to an event from an online ticket reservation system, oftentimes, the particular tickets associated with selected seats are encumbered before the ticketing transaction is complete. In other words, once the seats to the event are selected, the seats become encumbered such that they are no longer available to be purchased by others. There is typically a predetermined encumbrance period (e.g., five minutes, fifteen minutes, etc.) during which the transaction has time to complete. If the transaction is not completed within the encumbrance period, the tickets may be released and returned to the pool of available seats to the event.

In high velocity ticket sales events, the requested seats may not be available initially. For example, where someone desires x number of seats to an event and indicates a desire to sit in the orchestra section, the ticketing system may return a notification that the requested number of seats is not available in the requested section, but offers x number of contiguous seats in the mezzanine section. If the shopper declines the recommended seats, and instead conducts another search for x number of tickets in the balcony section, the ticketing system may likewise return a notification that the requested number of seats is not available in the requested section, and may offer another alternative if there is one available. In a high-velocity tickets sales situation, the event might quickly become sold out while someone continues to search for tickets that meet their criteria.

However, if a user accepts the recommended alternative tickets, these tickets can become encumbered, that is to say, removed from the pool of available seats and held for a predetermined encumbrance period thus providing a time period to complete the transaction. Where the encumbered tickets do not meet the criteria specified by the user, the user may nevertheless be hesitant to give up the encumbered seats for fear that the remaining seats will be sold or will otherwise be unavailable for purchase.

According to some embodiments, once a user has encumbered one or more seats, the user may be provided with an option to exchange the encumbered seats for other seats that are encumbered by another user. In this way, a user who has one or more encumbered seats can express a desire to exchange the encumbered seats with another user who likewise has encumbered seats and wishes to exchange. This system allows a user to continue to encumber seats while providing the ability to search for other, more desirable seats, without losing the ability to purchase the encumbered seats.

According to an embodiment, a system includes one or more processors and one or more memories coupled to the one or more processors. The one or more memories store instructions that, when executed by the one or more processors, cause the one or more processors to receive, from a first device of a first attender, a request for one or more first tickets to an event. The first attender may be a person who desires to attend an event and searches for tickets to the event that allow the attender to purchase tickets to attend the event. An attender may also be a person who purchases tickets for an event, but later provides the tickets to someone else and does not personally attend the event. The processors associate an encumbrance with the one or more first tickets to the event for an encumbrance period. That is, the tickets that are selected by the attender are made unavailable to other would-be purchasers. That may be done by removing the tickets from the pool of available tickets for an encumbrance duration.

The processors receive, from the first device of the first attender and prior to a purchase transaction for the one or more first tickets, a request to exchange the one or more first tickets to the event. That is, after the tickets are encumbered, but before they are purchased, the attender is given an option to request to exchange the encumbered tickets for alternate tickets that may likewise be encumbered by other attenders but have not yet been purchased by those attenders.

The processors determine one or more second tickets to the event, where the one or more second tickets to the event are associated with an encumbrance and are associated with a second attender. The processors then provide an offer to the first attender and the second attender to exchange the one or more first tickets with the one or more second tickets. Upon receipt of the offer to exchange encumbered tickets, the processors may receive, from the first device of the first attender, an indication of acceptance of the offer and likewise receive, from a second device of the second attender, an indication of acceptance of the offer. Based upon the acceptance of the offer to exchange the encumbered tickets, the processors cause the one or more second tickets to the event to be associated with the first attender and cause the one or more first tickets to be associated with the second attender. This may be done, for example, by updating respective online shopping carts associated with the first attender and the second attender to reflect the ticket exchange. The tickets may then be purchased, or if they are not purchased within the encumbrance duration, the tickets may be forfeited and returned to the pool of available tickets and be sold to another purchaser.

According to some embodiments, the instructions cause the one or more processors to determine a popularity of the event based at least in part upon a velocity of ticket sales being above a threshold. That is, the popularity of an event may be determined based upon how fast tickets are being sold. In some instances, tickets to a popular event may sell at a rate of thousands per minute, or tens of thousands per minute. The instructions may cause the one or more processors to determine the encumbrance period based upon the popularity of the event. That is, in some cases where the event may have a high popularity, the encumbrance period may be relatively short and thus encourage a user who has encumbered tickets, to either purchase the tickets relatively quickly, or return them to the pool of available tickets.

In some instances, the instructions cause the one or more processors to determine a change to the encumbrance period based upon the indication of acceptance of the offer received from the first device or the second device. That is, where tickets are exchanged, a new encumbrance period may be determined to allow the tickets to be purchased before the encumbrance period expires. For example, where a user initially encumbers tickets, the encumbrance period may be fifteen minutes which provides sufficient time for the user to complete a purchase transaction for the tickets. However, where the user searches to exchange the encumbered tickets prior to purchase, there may not be sufficient time after successful exchange of the tickets to complete the purchase transaction during the initial encumbrance period. Accordingly, once an encumbered ticket exchange is completed, a new encumbrance period may apply to provide the user sufficient time to complete the purchase transaction.

If, however, the tickets are not purchased within the encumbrance period, the encumbrance of the tickets may be released at the expiration of the encumbrance period and made available to other purchasers.

According to some embodiments, the request to exchange the encumbered tickets includes an indication of a desired section that may be different from the section of the venue in which the seats are located that are associated with the encumbered tickets, and the instructions may cause the one or more processors to find second tickets that are associated with seats located within the desired section.

According to some embodiments, a method of swapping encumbrances includes receiving a request for one or more seats to an event. That is, an attender, using a computing device, submits a request to the ticketing system with a request for one or more tickets to the event. In response, the ticketing system provides an indication of available seats to the event. The attender is able to accept the offered seats, and indicates a selection of the selected seats. Once the seats are selected, the ticketing system encumbers the selected seats. However, before completing a purchase transaction, the requester may send a request to exchange the selected seats. In response, the ticketing system can determine alternative encumbered seats to exchange for the selected seats. The ticketing system may then provide an option to exchange the selected seats for the alternative encumbered seats. The attender may indicate a desire to exchange the selected seats for the alternative encumbered seats, at which point the ticketing system may update the respective shopping carts so that the alternative encumbered seats are now available for purchase by the attender and conduct a purchase transaction for the alternative encumbered seats.

The method may further include unencumbering the selected seats at the expiration of an encumbrance period. In some cases, the option to exchange the selected seats for the alternative encumbered seats may be based upon a number of received requests for seats in a predetermined time period. That is, where a velocity of ticket sales is relatively high, the exchange option may be provided, and conversely, the exchange option may not be provided where the velocity of ticket sales is relatively low.

The method may include maintaining a database of available tickets and encumbered tickets and a request to exchange the selected seats may include criteria for different seats and the determining the alternative encumbered seats comprises searching the database of encumbered seats that meet the criteria.

Providing the indication of available seats may be performed by providing a graphical user interface that has an interactive seat map associated with a venue to the event. That is, the available seats may be indicated on a seat map of the venue and the available seats may be displayed in a particular manner that is different than that of seats that are encumbered. For instance, the available seats and the encumbered seats may be displayed using different colors or shades (e.g., available seats shown in a first shade/color and encumbered seats being shown in a second, different color), using text (e.g., "available" or "encumbered"), using different symbols or images, and so on. Additionally, the seat map may differentiate between seats that have been purchased and seats that have been encumbered, but not yet purchased.

The alternative encumbered seats can be selected based on a difference in price, section, venue, date, or seat configuration, or a combination of differences as compared with the selected seats. That is, a user may desire to sit in a different section, or purchase tickets at a different price point, at a different venue, or on a different date, or some other desired criteria, and the method may include finding encumbered seats that are available for exchange based upon this criteria.

The encumbrance of the selected seats may have an encumbrance duration attached thereto and the encumbered seats may be unencumbered at the expiration of the encumbrance duration. In some cases, the encumbrance duration is determined based at least in part upon a popularity of the event. Once tickets are exchanged, a second encumbrance duration may be determined to allow sufficient time to compete a purchase transaction for the tickets.

According to some embodiments a ticketing system receives a first request for a first number of seats to an event. The request may come from a computing device associated with an attender who desire to attend the event. In response to the request, the ticketing system provides an indication of first available seats to the event. This may be done by the ticketing system searching through a database of available seats to the event and finding seats that match, or most closely match, the request for seats. The system receives a selection of first seats to the event. The ticketing system encumbers the first seats to the event, such as by flagging them as unavailable within a ticketing database for an encumbrance duration. The ticketing system receives, from a second computing device associated with a second attender, a second request for a second number of seats to the event. Similar to the first request for tickets, the system provides an indication of second available seats to the event. The system receives a selection of second seats to the event and encumbers the second seats for the encumbrance duration. The system then receives a request to exchange the first seats and also receives a request to exchange the second seats. The system provides an indication to the first attender and the second attender that the first seats and the second seats can be exchanged. The system then receives a request to exchange the first seats for the second seats and likewise receives a request to exchange the second seats for the first seats. The ticketing system exchanges the first seats and the second seats, such as by updating a shopping cart system to reflect that the first seats are available to the second computing device and the second seats are available to the first computing device.

The method may further include conducting a purchase transaction for the first seats after the exchange of the first seats and the second seats. Where the seats are not purchased within the encumbrance duration, the seats may be unencumbered.

In some instances, where the encumbered seats are exchanged, a second encumbrance duration may apply for the exchanged seats. The encumbrance duration may be based at least in part upon a popularity of the event. That is, where the event has a relatively high popularity, the encumbrance duration may be relatively short, such as five minutes, ten minutes, fifteen minutes, or some other duration.

Turning now to the figures, FIG. 1 is a block diagram illustrating an example of a ticketing system 100 that provides for encumbrance exchange. In other words, seat encumbrances can be exchanged between multiple users who each have encumbered seats, but desire to exchange the encumbrance for different seats without giving up the encumbrance to the seats until an exchange occurs. One or more reservation servers 102 execute an event reservation system 104. The event reservation system 104 includes one or more processors 106. While the described system 100 may include different types and different numbers of processors 106, for efficiency, a single processor 106 will be referred to herein, but should not be construed as limiting. Furthermore, while the system 100 is described as incorporating one or more reservation servers 102, it should be appreciated that the system and its functionality can be offered as a cloud-based service where some, or all, of the described features can be shared between multiple computing devices spread across various locations. As such, reference to a reservation server 102 is intended to encompass and include a cloud-based service and associated hardware and software.

The processor 106 executes instructions stored on computer-readable storage media 108. The computer-readable storage media 108 is non-transitory and may store various instructions, routines, operations, and modules that, when executed, cause the processor 106 to perform various activities. In some implementations, the processor 106 may be a central processor unit (CPU), a graphics processing unit (GPU) or both CPU and GPU, or any other sort of processing unit. The non-transitory computer-readable storage media 108 may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information.

The computer-readable storage media 108 stores sets of instructions including seat selection instructions 110, seat encumbrance instructions 112, encumbrance exchange instructions 114, and transaction instructions 116.

The event reservation system 104 may store a seating map 118 of one or more venues (e.g., a stadium, a theatre, an auditorium, an arena, a music venue, etc.), such as in a database. The seating map 118 may be presented to a user device 120a, 120b by the reservation server 102 in response to a request for available seats to a scheduled event. The reservation server 102 may send and receive data over a network 122, which may be wired or wireless. The user device 120a may be associated with a first user who searches for available seats to the event. As used herein, the term seats is a broad term, and is generally used to refer to an attender's authorization to occupy a seat in a venue at an event. This description may use the terms "ticket" and "seat" interchangeably as a ticket is the instrument that shows proof of purchase and grants an attender the authority to occupy a seat or attend the event. Therefore, where an attender searches for, or purchases, "tickets" or "seats" to an event, the terms are used interchangeably. User device 120b may be associated with a second user who likewise searches for available seats to the event.

In use, user device 120a may send a request through network 122 to reservation server 102 inquiring about available seats to a scheduled event (e.g., a sports game, a play, a movie, a concert, etc.). The reservation server 102 may retrieve information from a database related to the event, such as the schedule for the event, the venue, the available seats, and the price for each seat or group of seats. The reservation server 102 may send data to the user device 120 that includes the seating map 118 and identifies the available seats, such as by color, shading, texture, or some other indication of the seats that are available. Alternatively, the request may indicate a number of desired seats and the reservation server 102 may select available seats and offer them to the user device 120.

The first user associated with the user device 120a may select the offered seats, such as a contiguous block of three mezzanine seats 128, and be given a time period in which to complete the transaction before the block of three mezzanine seats 128 are returned to the pool of available seats. During a similar time, a second user associated with user device 120*b* may request seats to the event and be provided with a selection of seats that most closely fit the request parameters, such as a block of three orchestra seats 130. The second user may select the block of three orchestra seats 130, at which point they may become encumbered and removed from the pool of available seats. Information associated with the seat encumbering may be stored, for example, in a database.

The first user, or the second user, may have encumbered the seats based upon the recommendation of the reservation system 100 indicating that the offered seats are the available seats that mostly closely match with the request. However, the seats may not be ideal, or even acceptable, to the first user or the second user, and wish to look further for alternate seats. The first user can indicate a desire to exchange the encumbrance of the offered seats. Likewise, the second user can indicate a desire to exchange the encumbrance of the offered seats. The first user and second user may indicate additional criteria for more preferable seating, such as a desired section, a desired price point, a configuration of a block of seats (e.g., 8 seats in a single row or 8 total seats with 4 seats each in adjacent rows), or some other criteria. Based upon the additional criteria, the encumbrance exchange instructions 114 may cause the reservation system 104 to offer the first user and the second user the opportunity to switch their encumbrances with one another. The offer may indicate the specific seats, such as by section, row, and seat number, and may additionally include a price difference, if any.

The first user and the second user may each be given the option to accept the offer to exchange the encumbered seats for alternate encumbered seats, and if both parties agree to the exchange, the event reservation system 104 exchanges the encumbered seats. This may be accomplished, for example, by updating the respective shopping carts to indicate the exchanged encumbrances. More specifically, the first user may have first seats initially selected for purchase. However, upon an exchange of encumbered seats, the first seats are removed from the first user's shopping cart. The ticketing system may then associated second seats with the shopping cart of the first user to effectuate the exchange of the first seats for the second seats. In a similar way, the second user has the initially selected second seats removed from their shopping cart and replaced with the first seats. However, if one of the parties does not agree to the exchange of encumbered seats, then the exchange may not happen and each party still has their respective encumbered seats they may elect to purchase.

The seat encumbrance instructions 112 allow the reservation server 102 to encumber the seats so that they are at least temporarily unavailable to other purchasers. The encumbering of the seats may be timebound, such as for ten minutes, fifteen minutes, twenty minutes, or some other interval of time. This provides the purchaser time in which to complete the transaction for the selected seats.

The transaction instructions 116 executed by the reservation servers 102 allow the user device 120*a*, 120*b* to complete a purchase for tickets associated with the selected seats 128, 130 respectively. This may include instructions related to financial processing of credit or debit card payments, triggering the distribution of tickets whether physical or electronic, and permanently encumbering the purchased seats, among other things.

Figure 2:
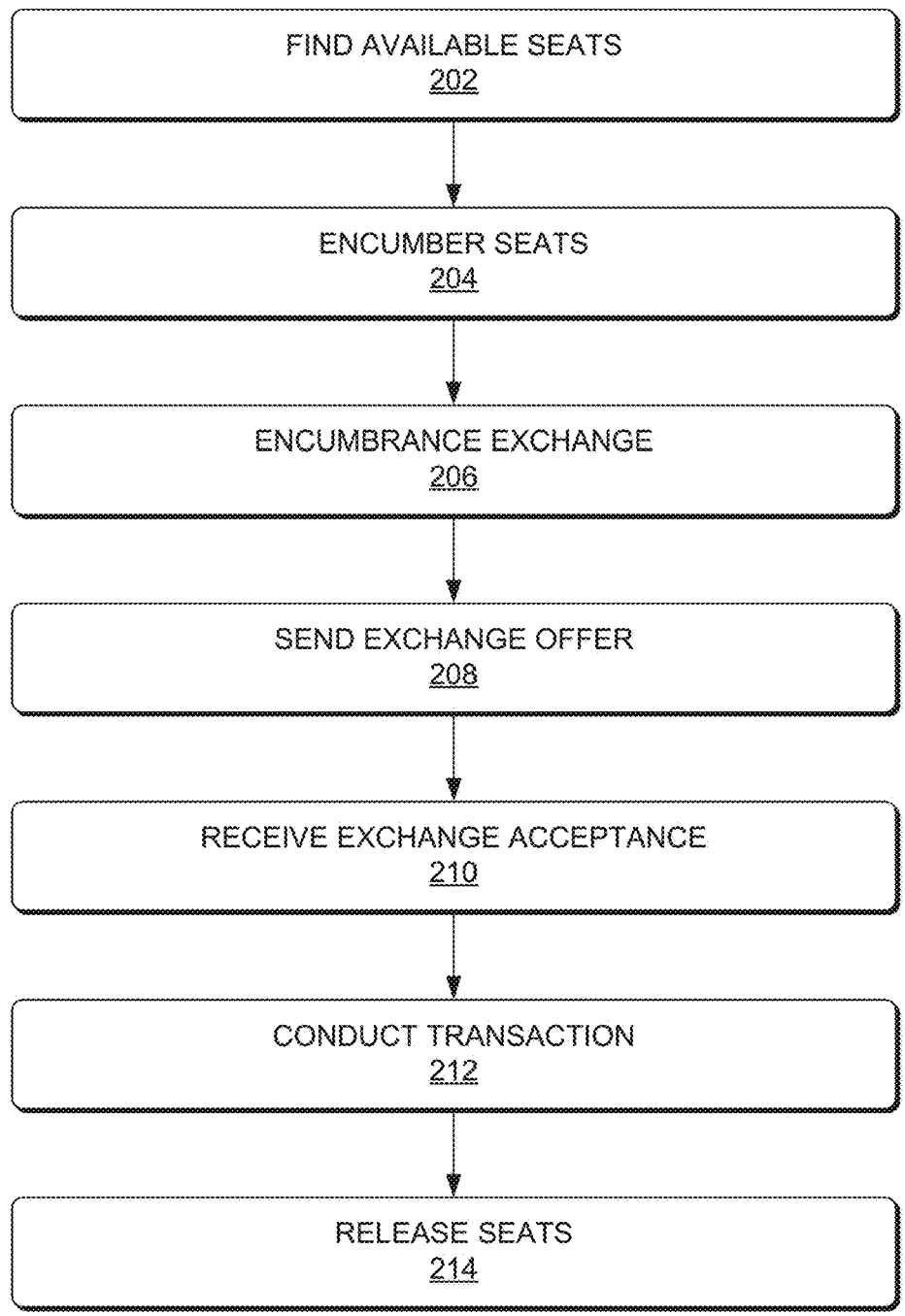
FIG. 2 is a flow diagram of an example process for exchanging encumbrances.

With reference to FIG. 2, an example process 200 for exchanging encumbranced seats is provided. At block 202, the system searches for available seats. This process may receive as an input, an identity of an event, a venue for the event, a desired section, a desired price or price range, a desired number of tickets, and a show date and show time, among other things. The system may find one or more alternative seat locations that meet the requested criteria and provide these locations to a user. For instance, the alternative seat locations may be associated with seats to the requested event, but the seats may not be consistent with the criteria provided by the user (e.g., not in the desired section, not at the desired price/range, not the desired number of tickets, etc.).

At block 204, one or more seats are encumbered. This may be performed, for example, when a user selects one or more seats for purchase. The seat encumbrance based upon seat selection may be limited in time, such as for ten minutes, or twenty minutes, or some other time interval to provide the user with ample time to complete the transaction for the selected seats. At some point, the purchaser may decide to see if alternative seats are available, such as in a different section, at a different price point, as a different block of seats, or for a different show time or date.

At block 206, the purchaser indicates a desire to exchange the encumbered seats for alternative seats. In some instances, if a purchaser gives up the encumbered seats to search for alternative seats, the previously encumbered seats may be made available to others and possibly sold to another purchaser, which may cause the previously unencumbered seats to be unavailable to the original purchaser who decided to search for alternative seats. The original purchaser may not be able to find more preferable seats and may wish to purchase the originally encumbered seats. However, in a high-velocity ticket sales situation, the originally encumbered seats may no longer be available, and in fact, no seats may be available that fit the purchaser's criteria.

Instead, rather than give up the encumbered seats to search for alternative seats, the purchaser may indicate a desire to exchange the encumbered seats without giving up the encumbrance. At block 206, the encumbered seats can be exchanged with other seats that are encumbered. According to some embodiments, multiple purchasers may each indicate a desire to exchange seats that they have encumbered. The desire to exchange encumbered seats may include criteria that would make a suitable exchange, and may include, among other things, a more preferable seating section, number of tickets, price range, ticket price, event date, or some other criteria. The process 200 may include searching the encumbered seats to find one or more that most closely match the requested criteria.

At block 208, the system 200 may present an exchange offer to a purchaser who has encumbered seats. The exchange offer may be presented to a purchaser who has indicated a desire to exchange the encumbered seats, or the exchange offer may be presented to a purchaser who has not indicated a desire to exchange the encumbered seats, but who otherwise fits the exchange criteria. In some embodiments, the exchange offer may be provided to the purchaser via a website or mobile application that is being used to search for the event/seats, an e-mail message, a text message, or in any other manner.

At block 210, the system 200 receives an indication that the exchange offer has been accepted. In some cases, the exchange offer will be exchanged by two or more purchasers who have encumbered seats. When the exchange offer has been accepted by all parties to the exchange (e.g., via the website/mobile application, an e-mail message, a text message, etc.), the encumbrance exchange may be affected, such as by updating each purchaser's electronic shopping cart to reflect that the exchange has taken place.

At block 212, the transaction for the purchase of the selected seats is completed. At this point, the selected seats may be permanently encumbered so that they are not offered for sale to another purchaser. The purchaser completes the transaction to purchase one or more of the seats. The purchaser may purchase all of the exchanged seats, or may elect to purchase less than the exchanged seats. For example, where a purchaser receives ten encumbered seats during an exchange, the purchaser may not purchaser all ten of the seats, but rather, may elect to purchaser fewer than the ten encumbered seats.

At block 214, the encumbered seats are released. In some instances, the seats may not be purchased within a predetermined time period for encumbering. In this case, the unpurchased seats may return to the general pool of available seats for purchase by another customer. Additionally, the purchaser may complete the transaction for fewer than the number of encumbered seats, and the non-purchased seats that were encumbered may be released for purchase by other users.

Figure 3:
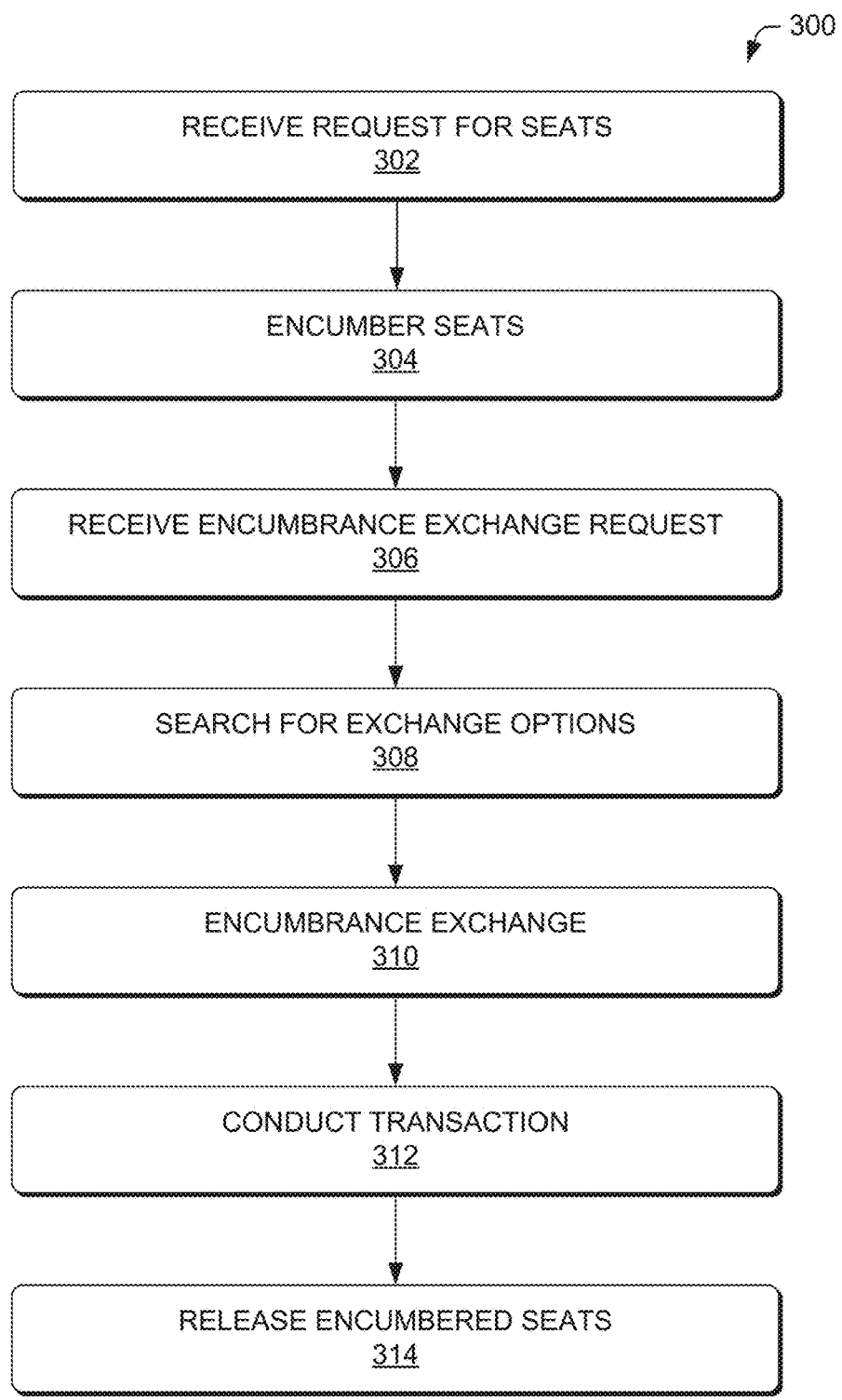
FIG. 3 is a flow diagram of an example process for exchanging encumbrances.

With reference to FIG. 3, an example process for exchanging seat encumbrances 300 is illustrated. At block 302, the system receives a request for a specified number of seats. The request may additionally include a desired section, price point, or other desired criteria. The system 300 may present one or more selections that meet the specified criteria. For instance, were the seat request criteria indicates a desire to purchase four seats within a lower-level section, the system 300 may present four contiguous seats in row J in the mezzanine section, and alternative seats that include four seats split into two rows, such as in rows O and P, and in a separate portion of the mezzanine section. Of course, the system 300 may present one, two, three, or more alternative selections of available seats.

At block 304, a user selects the seats for purchase. The selected seats may then be encumbered and marked as unavailable for purchase by another user. The encumbrance may be for a predetermined period of time, which may be referred to as an encumbrance period, and may give the user sufficient time to complete the purchase transaction for the seats.

At block 306, one or more users may indicate a desire to exchange the encumbrance. The indication may include an alternate section, an alternate number of seats, an alternate price, an alternate event date, or some other criteria.

At block 308, the system 300 searches for exchange options that may satisfy the search criteria. For instance, the system 300 may maintain a database of encumbered seats where the encumbrance is still temporary. It may also include a search of seats that are encumbered and for which the encumbrance holder has indicated a desire to exchange their encumbrance. Where the system 300 finds one or more suitable matches for an exchange, the system 300 may indicate an offer to exchange the encumbrances. The users that are holding the respective encumbrances may either accept the exchange or decline the exchange.

At block 310, two or more encumbrances may be exchanged. That is, where two or more users accept the offer to exchange their encumbered seats, the system 300 executes the exchange. This may be performed, for example, by updating the respective user's online shopping cart to reflect the seats obtained during the exchange. At this point, the encumbrance may still be temporary, and the user may need to complete the transaction before the encumbrance period expires. However, the encumbrance period may be extended after an exchange to provide each respective user a sufficient amount of time to complete the transaction. The encumbrance period may be determined, for example, based upon the ticket sale velocity, the remaining encumbrance period for the tickets that were exchanged, or on some other factor.

At block 312, the transaction is conducted, such as by executing a check out system of an online shopping system. The user may provide payment information, such as a credit card, debit card, gift card, a previously provided credit, account information, or some other form of payment. The seats may be permanently encumbered based upon the successful completion of the transaction. As discussed, the purchased seats may be less than the number of encumbered seats.

At block 314, after a predetermined time period, the seats that were previously encumbered that have not been purchased are released for general sale to the public. This may be based upon expiration of a predetermined amount of time, such as fifteen minutes, twenty minutes, or some other period of time. In other cases, the encumbrance time may depend upon the popularity of an event. For example, the popularity of an event may be known before tickets become available, and a relatively short encumbrance time may be preselected. For example, the popularity of an event may be determined based upon pre-orders for tickets, mentions of the event on social media, or prior ticket sales of the event or a similar even at a different venue. The popularity of the event may additionally be determined by the quantity of advertising or the budget spent on advertising for the event. In other cases, the popularity of the event may be determined based upon the rate at which the seats are being encumbered and/or sold. In this case, the encumbrance time may be adjusted based upon the increasing, or decreasing, popularity of the event. In some cases, the velocity of ticket sales may exceed a threshold velocity, which may trigger an adjustment of the encumbrance time. Additionally, where the ticket sales velocity crosses a threshold (which may by an increase above a threshold or a decrease below a threshold), the ability to exchange encumbrances may be activated or deactivated. For example, where the ticket sale velocity is above a threshold, such as for example where tickets are selling at a velocity of greater than 100 tickets per minute, the purchasers may be given an option to exchange the encumbered seats. However, where the ticket sales velocity falls below a threshold (e.g., 10 tickets per minute), the option to exchange encumbered seats may not be available.

Figure 4:
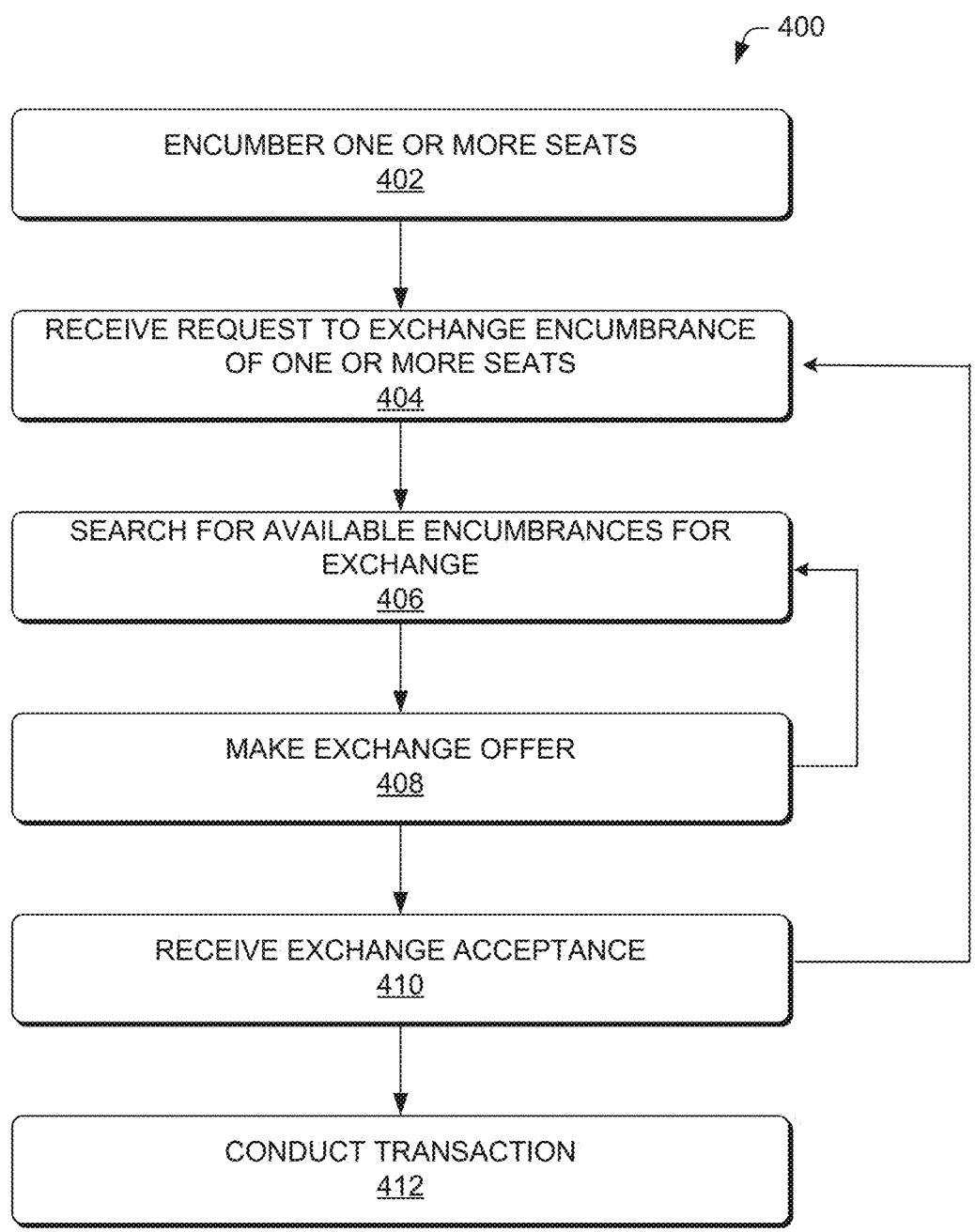
FIG. 4 is a flow diagram of an example iterative process for finding and exchanging available encumbrances.

With reference to FIG. 4, an example iterative process for searching for and exchanging encumbrances 400 is illustrated.

At block 402, one or more seats are encumbered. This may be performed at a time when a user requests a number of seats. The encumbrance may also happen in response to a user requesting a desired number of seats which may be during the period of time in which the user is searching for available seats, or may happen at a time when a user selects seats presented by the system. For instance, where a user searches for a specific number of desired seats to an event, the system may present multiple options in response. The user may select one of the presented options, at which the selected seats may become encumbered, or otherwise unavailable to the general public.

At block 404, a request is received to exchange the encumbrance of one or more seats that are encumbered. The request may include additional or alternative criteria, such as, for example, a different price, a different section, a different number of seats, a different venue, a different time, a different day, or some other criteria, or a combination of criteria.

At block 406, the system searches for available encumbrances for exchange. In some cases, the system searches among other encumbrances for which the encumbrance holder has indicated a desire to exchange the encumbrance. The system can match the request and provide offers to exchange the encumbrances. In some cases, the system may match two, three, four, or more encumbrances available for an exchange. Furthermore, the system may match a group exchange that requires approval from multiple encumbrance holders. As an example, customer A has an encumbrance for four tickets in section 104 but wants four tickets in section 204. Customer B has an encumbrance for four tickets in section 204, but wants three tickets in section 108. Customer C has four tickets in section 108, but wants four tickets in section 104. A three-way match between customers A, B, and C may be identified and the option is provided to each customer to exchange their tickets. Notably, Customer B may be able to swap his encumbrance of four tickets for three tickets. There is no necessity that the number of tickets be equal for an encumbrance swap.

Furthermore, while the above example included three customers, an encumbrance exchange may involve more than three customers and can involve nearly any number of customers to involve in an encumbrance exchange.

In a simple example, Customer A has two tickets in section 102 and wants two tickets in section 104. Customer B has two tickets in section 104 but wants two tickets in section 102. The system can identify these two customers for a potential exchange and provide information to the customers to enable them to evaluate the exchange and either accept or decline.

At block 408, an exchange offer is made to two or more users to exchange their encumbrance. With the immediately preceding example, Customer A may be offered an exchange of his tickets for Customer B's tickets in section 104. Likewise, Customer B may be offered an exchange of his tickets for Customer A's tickets in section 102. Where both parties agree to the exchange, they indicate their acceptance.

At block 410, the system receives an acceptance of the exchange offer. The system may then execute the exchange, such as by updating the respective user's shopping carts to reflect the exchanged tickets. As described, the encumbrance exchange may be between several users, and each respective shopping cart may be updated to reflect the exchange of encumbrances. If an attender is not pleased with the exchanged seats, the attender may submit another request to exchange the encumbered seats for alternative seats and the process may return to block 404. At this point, the process may proceed to block 406 and search for available encumbrances for another exchange. This process may be repeated until an attender accepts the available tickets and either purchases the tickets, or the encumbrance period expires and the tickets are returned to the pool of available tickets.

At block 412, the transaction is conducted. Each user involved in the exchange may be presented with the ability to complete the transaction for the exchanged tickets, such as by completing a purchase transaction, after which the tickets may be permanently encumbered and unavailable to other purchasers.

As described above, the exchange does not necessarily need to be a one to one exchange. That is, one user may exchange eight tickets and receive five tickets in return. Likewise, a user may exchange four tickets and receive eight tickets in return, even though the user may only desire to purchase four tickets. Where the user completes the transaction, but does not purchase all of the tickets received during the exchange, the remaining unpurchased tickets may be returned to the pool of available tickets and their encumbrance may be released.

Returning to block 408, in a situation in which the offer to exchange tickets is declined by one or more parties, the system may return to block 406 to search for another available encumbrance for exchange. In some cases, such as where multiple parties have accepted the offer, but only a single customer has declined, the system may find a user to replace the declining party, and make the exchange offer again. In any event, the system may iterate between blocks 406 and 408 until a suitable exchange is found, offered, accepted, and executed.

The encumbered seats may have an encumbrance period associated therewith. The encumbrance period may be based upon a time period from the initial encumbrance of the seats, based upon the most recent offer of exchange, upon the completion of an exchange, upon the popularity of the event, or on some other metric.

Figure 5:
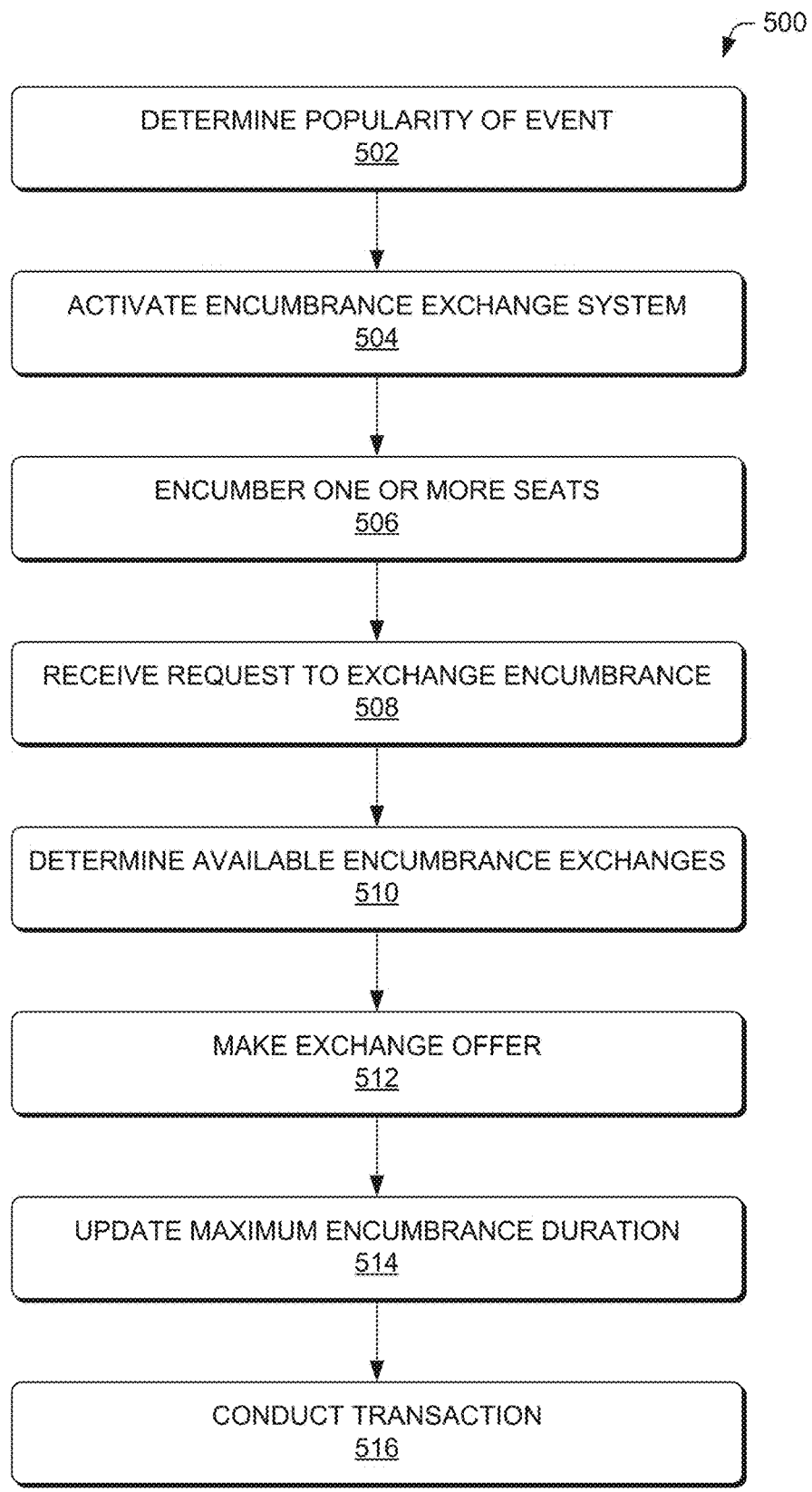
FIG. 5 is a flow diagram of an example process for dynamically activating and exchanging seat encumbrances.

With reference to FIG. 5, a process for dynamically activating and exchanging seat encumbrancing 500 is illustrated. At block 502, the popularity of the event is determined. An event's popularity may be based, for example, upon prior sales of the event at the same or a different venue, or prior sales of a similar or related event at the same or a different venue. As an example, a singer may have previous performances sold out in a matter of days, which may indicate a high popularity. Where an event is expected to have a high popularity, the encumbrance exchange system may be initially activated. In other instances, where the expected popularity of the event is relatively low, the encumbrance exchange system may not even be used and the tickets may all be sold on a first-come-first-served basis. In other cases, the encumbrance duration may be set to a very low duration, or to a relatively long duration.

At block 504, the encumbrance exchange system is activated, which may be based upon the popularity of an event. For example, for an event having a low expected popularity, the encumbrance exchange system may not be employed while for an event having an expected high popularity, the encumbrancing exchange system may be activated immediately upon the on-sale date, for tickets to the event.

At block 506, one or more seats are encumbered. This may be based, for example, upon a user selecting one or more seats for purchase. In some ticketing systems, a user is able to search for available seats, such as by viewing a seat map, based upon price range, section number, or some other criteria. The ticketing system may present the user with available options that meet the search criteria. Once the user selects one of the ticketing options, the selected seats may be encumbered for an encumbrance period. The encumbrance period may be determined based upon the popularity of the event, the time until the event is schedule to take place, the number of available tickets, or other factors that influence the demand for the tickets.

At block 508, a request to exchange an encumbrance is received. The request may be during the checkout process, or may be upon selecting the seats from the available seats. In some cases, seats may be sold at a rate of thousands per minute, or even ten thousand per minute. In these high velocity ticket sales situations, a user may not have the luxury of searching repeatedly for tickets that are most desirable to the user, but rather, must grab the first available tickets, or risk not being able to get tickets to the event at all. By encumbering the first available tickets, the user is at least provided the opportunity to get seats to the event. After the seats are selected, the user may indicate a desire to exchange the encumbrance for other encumbered tickets that are not available to the general public because they have likewise already been encumbered by other users.

At block 510, the existing encumbrances available for exchange are determined. This determination may be made based upon other users who have indicated a desire to exchange encumbrances. Additionally, the determination may also be made based upon tickets that have been encumbered but not yet purchased. The determination may be between two users who each have encumbered tickets that the other desires. It may also be more complex and involve various users, numbers of tickets, or other factors that may not perfectly match a requested exchange. For instance, where customer A has 6 encumbered tickets in section 110 and desires 8 tickets in section 210, customer B may have 4 tickets in section 210 and customer C may have 4 tickets in section 210. The system may determine a match between Customer A and Customers B and C. Even though Customers B and C may not have indicated a desire to exchange their tickets, a match of available encumbrance exchanges may be determined nevertheless.

At block 512, an offer is extended to the encumbrance holders to exchange one or more of their tickets. Again, the exchange need not be a parity exchange. That is, a different number of tickets may be given and received by a user. In response to the exchange offer, each user that is offered the exchange can either accept or decline the exchange.

At block 514, the maximum encumbrance duration is determined. For instance, where a user declines to exchange tickets, the original encumbrance duration may continue to apply to the tickets the user has encumbered. In other instances, the encumbrance period may be extended. For example, where a user exchanges encumbrances, and the encumbrance period is relatively short, the user may not have sufficient time to complete the transaction to purchase the tickets. In this case, the user may be provided with an extended encumbrance period in which to complete the transaction. In other instances, once an exchange is effected, a new encumbrance period may be applied to the exchange tickets, such as an encumbrance period of five minutes, ten minutes, fifteen minutes, or some other duration.

At block 516, the transaction is conducted with one or more users who have exchanged encumbrances. The transaction may be conducted through any suitable transaction system, such as an online shopping cart and checkout procedure, through automated payment systems, through a mobile payment or digital wallet service, or some other suitable transaction system.

Figure 6:
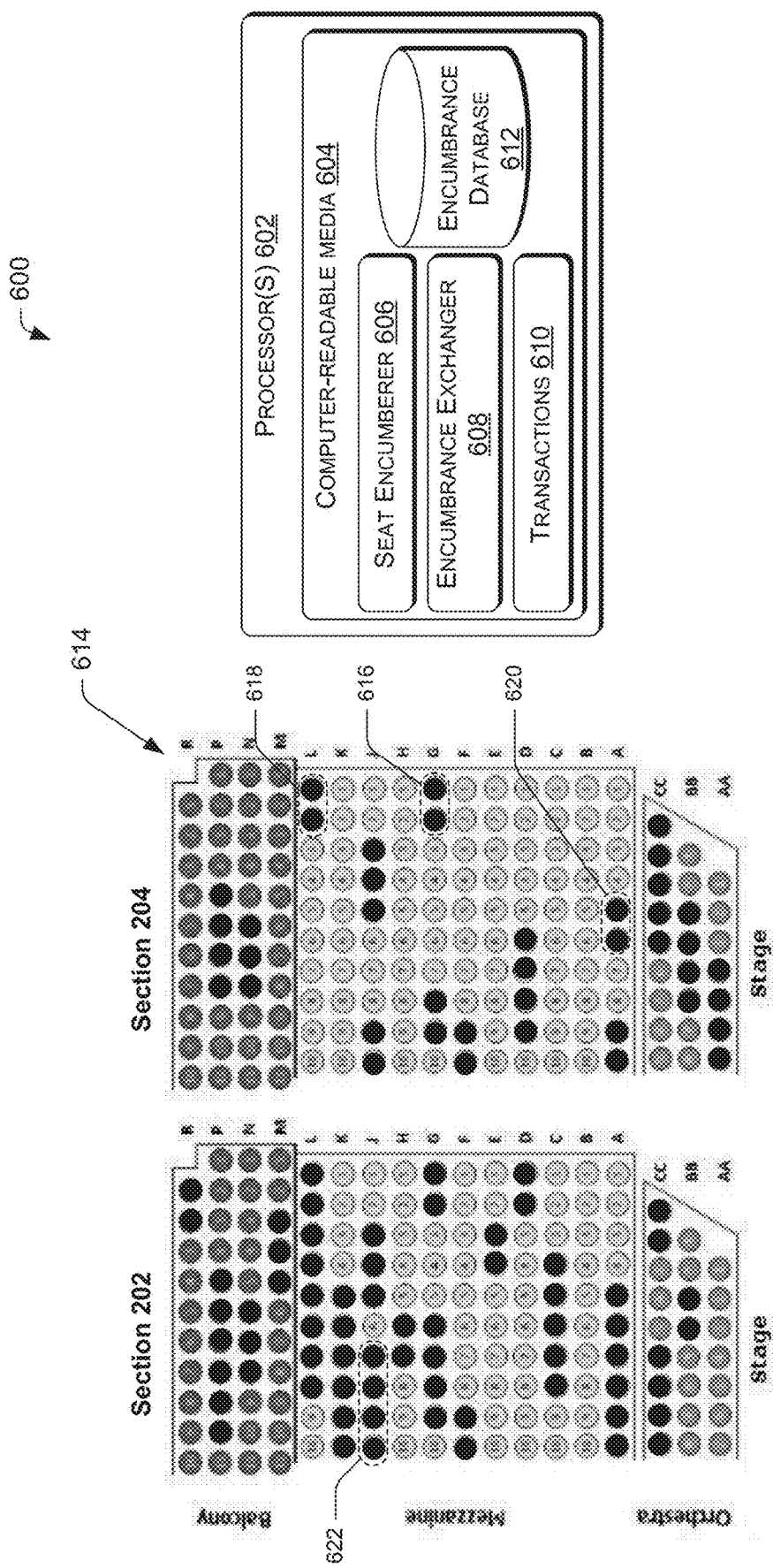
FIG. 6 is a block diagram of an example ticketing system.

With reference to FIG. 6, a ticketing system 600 is shown as a block diagram. According to some embodiments, the ticketing system 600 includes one or more processors 602 in communication with computer-readable media 604. Of course, as described above, it should be apparent that the system and methods described herein could be performed as a cloud-based solution, and so the functions of a single processor and media may be implemented as a series of shared computing resources spread across a large geographic area.

The computer-readable media 604 stores instructions that result in seat encumberer 606, encumbrance exchanger 608, and transactions 610. The computer-readable media 604 may store an encumbrance database 612 which may include inventory data associated with encumbered and available seats to an event. Of course, the processors 602 may gain access to the encumbrance database 612 stored remotely from the computer-readable media 604.

In use, the seat encumberer 606 assists a purchaser with finding available seats at a venue for a specific event. As an example, where a first purchaser indicates a desire to reserve ten seats at an event in the mezzanine section, the seat encumberer 606 may retrieve a seating chart 614 that is specific to the venue and to the event. The seat encumberer 606 may further determine which seats are already encumbered (shown as filled in circles) and thus unable for reservation by the purchaser. The seat encumberer 606 may identify three locations within the venue that have available seats that meet the seating criteria requested by the purchaser.

The first block of seats 616 in row G may be presented to the purchaser with the option of reserving the two seats. Upon recommending the block of seats to the purchaser, the seat encumberer 606 may temporarily encumber all the seats in the block of seats until the purchaser has sufficient time to either complete the transaction of the seats, or indicate a desire to search for alternate seats. The purchaser may indicate that he does not want the first two seats offered, and the first block of seats 616 may be immediately unencumbered, thereby making them available for another purchaser.

The seat encumberer 606 may next recommend a second block of seats 618 containing two seats in row L. The second block of seats 618 may be temporarily encumbered until the purchaser indicates a desire to search for additional seats, at which point, the encumbrance may be released and the seats are returned to the pool of available seats.

The seat optimizer may next recommend a third block of seats 620 containing two seats in row A. The third block of seats 620 may be temporarily encumbered and the purchaser may indicate a desire to reserve the third block of seats 620 and may immediately purchase the seats 620. The transactions instructions 610 allow the purchaser to proceed with a purchase of tickets associated with the selected seats. This may require specialized data processing capabilities, brokering connections, concurrency controls, atomicity controls, and security, among other specialized features.

The specialized data processing capabilities may allow numerous transactions to occur simultaneously. For example, brokering connections may allow the workload of processing transactions to be distributed among multiple computing resources over a network. The concurrency controls provide that two purchasers will not be able to access and change the same data at the same time. This may be handled by the encumbrance capabilities of the system so that two purchasers will not be able to purchase tickets associated with the same seat, even if those two transactions are occurring at the same time. Atomicity controls ensure that the steps in the transaction are all completed as a group. Conversely, the atomicity controls provide that if a part of the transaction fails, then all steps in the transaction also fail.

The purchased seats 620 may be permanently encumbered. However, before the transaction has been completed, the purchaser may indicate a desire to exchange the encumbered seats 620. For instance, the user may decide that the seats in Row A are too expensive, or wants to purchase 4 seats instead of two. Rather than giving up the two front row seats and risking that more desirable seats are available, the user may indicate a desire to exchange the encumbrance of the seats 620.

The encumbrance exchanger 608 may search for encumbered seats that are available for exchange, such as by searching the encumbrance database 612. The encumbrance database 612 may include seats that have been encumbered but not yet purchased. Where the encumbrance exchanger 608 finds a match between a request to exchange encumbrances and encumbered seats, the encumbrance exchanger may provide an offer to exchange encumbrances. For example, where Customer A has two seats 620 in row A of the mezzanine level of section 204 encumbered, Customer A may indicate that he prefers four seats in the mezzanine level of Section 202. Customer B may have four seats 622 in Row J of section 202 encumbered and may be presented with an exchange offer. For instance, customer B may be offered to exchange the four seats 622 for Customer A's two front-row seats 620, and may additionally be offered two more seats, such as two more seats adjacent to Customer A's seats, or near Customer A's seats. Where both Customer A and Customer B accept the exchange, their respective shopping carts may be updated to reflect the exchange of seats.

The transactions 610 may then be implemented to complete the transaction of Customer A and Customer B, such as by collecting payment information to complete the purchase transaction.

The combination of the seat encumberer 606, encumbrance exchanger 608, and the transactions 610, among other things, results in a system that solves a unique dilemma with online ticketing. A specific-purpose system is created that can not only determine available seats, but can also determine encumbered seats that have not yet been purchased, and allow encumbered seats to be exchanged between different users. Moreover, the encumbered seats can be exchange between a plurality of users, such as in a four-way exchange, or higher order exchange involving more parties that have encumbered seats. As described herein, a specific set of rules allows the seat encumberer to find encumbered seats and present offers for exchange.

While the encumbrance exchange system described herein may be incorporated into a ticketing system, the encumbrance exchange system could be separate from a ticketing system and selectively used with a wide variety of ticketing systems. For example, a ticketing system could rely on an encumbrance exchange system provided by an independent party, or the encumbrance exchange functionality could be provided from separate computing resources and integrated into a ticketing system. In some cases, an encumbrance exchange system could be provided as a software as a service ("SaaS") solution to be used with an existing ticketing system.

A system that is capable of exchanging encumbered seats provides increased efficiencies. For example, a purchaser who searches for available seats early during the ticket sales window may be able to encumber seats before the seats are sold out. Once the seats are encumbered, the user may be able to search for encumbered seats with which to conduct an exchange. For instance, a user may be able to encumber two separate non-contiguous blocks of eight seats total, but wants to exchange those seats for eight seats that are contiguous, such as all adjacent within the same row, or may be adjacent to one other in adjacent rows. The result is an improved ticketing system that allows a user to search for alternative seats without forfeiting the encumbrance to seats and risking not being able to get tickets at all.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied.

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system comprising:
   one or more processors; and
   one or more memories coupled to the one or more processors, the one or more memories storing instructions that, when executed by the one or more processors, cause the one or more processors to:
      receive, from a first device of a first attender and via an electronic interface provided by one or more servers of a centralized ticket service, a first request for one or more first tickets to an event that have yet to be initially purchased;
      place the one or more first tickets to the event in a first virtual shopping of the first attender;
      associate, prior to a first initial purchase transaction for the one or more first tickets and by the one or more servers, a first encumbrance with the one or more first tickets to the event in the first virtual shopping cart for an encumbrance period;
      receive, from the first device of the first attender, prior to the first initial purchase transaction, and via the electronic interface, a second request to exchange the one or more first tickets to the event;
      determine, by the one or more servers, one or more second tickets to the event that have yet to be initially purchased and have been placed in a second virtual shopping cart of a second attender, the one or more second tickets to the event associated with a second encumbrance and associated with the second attender;
      provide, via the electronic interface, prior to the first initial purchase transaction, and prior to a second initial purchase transaction for the one or more second tickets, an offer to the first attender and the second attender to exchange the one or more first tickets and the one or more second tickets;
      receive, from the first device of the first attender, prior to the first initial purchase transaction and the second initial purchase transaction, and via the electronic interface, a first indication of acceptance of the offer;
      receive, from a second device of the second attender, prior to the first initial purchase transaction and the second initial purchase transaction, and via the electronic interface, a second indication of acceptance of the offer;
      cause, prior to the second initial purchase transaction and by the one or more servers, the one or more second tickets to the event to be associated with the first attender and automatically update the first virtual shopping cart of the first attender to reflect the one or more second tickets; and
      cause, prior to the first initial purchase transaction and by the one or more servers, the one or more first tickets to be associated with the second attender and automatically update the second virtual shopping cart of the second attender to reflect the one or more first tickets.

2. The system as in claim 1, wherein the instructions cause the one or more processors to determine a popularity of the event based at least in part upon a rate of ticket sales being above a threshold, the instructions further causing the one or more processors to determine the encumbrance period based at least in part upon the popularity of the event.

3. The system as in claim 1, the instructions causing the one or more processors to determine a change to at least one of the first encumbrance or the second encumbrance upon the first indication of acceptance of the offer received from the first device or the second indication of acceptance of the offer received from the second device.

4. The system as in claim 1, the instructions causing the one or more processors to release the first encumbrance of the one or more first tickets to the event in the first virtual shopping cart at an expiration of the encumbrance period.

5. The system as in claim 1, wherein the second request to exchange the one or more first tickets includes an indication of a desired section, and the instructions cause the one or more processors to determine the one or more second tickets that are associated with seats located within the desired section.

6. A method comprising:
receiving a first request for one or more seats to an event;
providing an indication of available seats to the event;
receiving a selection of one or more selected seats of the available seats;
placing the one or more selected seats in a first virtual shopping cart;
subjecting the one or more selected seats in the first virtual shopping cart to a first encumbrance for a first time period;
receiving, prior to a completion of an initial purchase transaction for the one or more selected seats, a second request to exchange the one or more selected seats;
determining one or more alternative encumbered seats to exchange for the one or more selected seats, the one or more alternative encumbered seats being in a second virtual shopping cart subject to a second encumbrance for a second time period;
providing an option to exchange the one or more selected seats for the one or more alternative encumbered seats;
receiving an indication to exchange the one or more selected seats for the one or more alternative encumbered seats; and
facilitating a transaction for the one or more alternative encumbered seats, wherein facilitating the transaction for the one or more alternative encumbered seats comprises placing the one or more alternative encumbered seats in the first virtual shopping cart and placing the one or more selected seats in the second virtual shopping cart.

7. The method of claim 6, further comprising upon receiving the selection of the one or more selected seats, associating the first time period with the one or more selected seats in the first virtual shopping cart; and
unencumbering the one or more selected seats in the first virtual shopping cart at an expiration of the first time period.

8. The method of claim 6, wherein providing the option to exchange the one or more selected seats for the one or more alternative encumbered seats is based at least in part upon a number of received requests for seats in a predetermined time period.

9. The method of claim 6, wherein the indication to exchange the one or more selected seats comprises criteria for one or more different seats and the determining the one or more alternative encumbered seats comprises searching a database of encumbered seats that satisfy the criteria.

10. The method of claim 6, wherein providing the indication of available seats comprises providing a graphical user interface having an interactive seat map associated with a venue at which the event is to be located.

11. The method of claim 6, further comprising selecting the one or more alternative encumbered seats based at least in part on at least one of a difference in price, section, venue, date, or seat configuration compared with the one or more selected seats.

12. The method of claim 6, wherein subjecting the one or more selected seats in the first virtual shopping cart to the first encumbrance comprises determining the first time period and further comprising:
after facilitating the transaction, subjecting the one or more alternative encumbered seats in the first virtual shopping cart to a third encumbrance for a third time period; and
unencumbering the one or more alternative encumbered seats in the first virtual shopping cart at an expiration of the third time period.

13. The method of claim 12, further comprising determining a popularity of the event, the popularity of the event being based upon at least one of a rate of ticket sales being above a first threshold, a number of pre-orders for tickets to the event being above a second threshold, or a number of mentions on one or more social media sites being above a third threshold; and
determining the first time period based at least in part upon the popularity of the event.

14. The method of claim 13, further comprising determining the second time period after receiving the second request to exchange the one or more selected seats.

15. A method comprising:
receiving, from a first computing device, a first request for a first number of seats to an event;
providing, in response to the first request, a first indication of first available seats to the event;
receiving a first selection of one or more first seats to the event, the one or more first seats being a subset of the first available seats;
placing the one or more first seats to the event in a first virtual shopping cart;
encumbering the one or more first seats to the event in the first virtual shopping cart for an encumbrance duration;
receiving, from a second computing device, a second request for a second number of seats to the event;
providing, in response to the second request, a second indication of second available seats to the event;
receiving a second selection of one or more second seats to the event, the one or more second seats being a subset of the second available seats;
placing the one or more second seats to the event in a second virtual shopping cart;
encumbering the one or more second seats to the event in the second virtual shopping cart for the encumbrance duration;
receiving, prior to a first initial purchase transaction for the one or more first seats and prior to a second initial purchase transaction for the one or more second seats, at least one of a third request to exchange the one or more first seats or a fourth request to exchange the one or more second seats;
determining, prior to the first initial purchase transaction and the second initial purchase transaction, that the one or more first seats and the one or more second seats are eligible to be exchanged; and
exchanging, prior to the first initial purchase transaction and the second initial purchase transaction, the one or more first seats and the one or more second seats by placing the one or more second seats in the first virtual shopping cart and placing the one or more first seats in the second virtual shopping cart.

16. The method of claim 15, further comprising facilitating a purchase transaction for the one or more first seats in the second virtual shopping cart after exchanging the one or more first seats and the one or more second seats.

17. The method of claim 15, further comprising unencumbering the one or more first seats or the one or more second seats at an expiration of the encumbrance duration.

18. The method of claim 15, wherein the encumbrance duration is a first encumbrance duration and further comprising determining, in response to exchanging the one or more first seats and the one or more second seats, a second encumbrance duration for the one or more first seats and the one or more second seats.

19. The method of claim 15, further comprising determining the encumbrance duration based at least in part upon a popularity of the event.

20. The method of claim 19, wherein the popularity of the event is based on at least one of a first rate of ticket sales being above a first threshold, a number of pre-orders for tickets to the event being above a second threshold, a second rate of ticket sales for a similar event held at a different venue being above a third threshold, or a number of mentions on one or more social media sites being above a fourth threshold.

* * * * *